Patented Jan. 3, 1928.

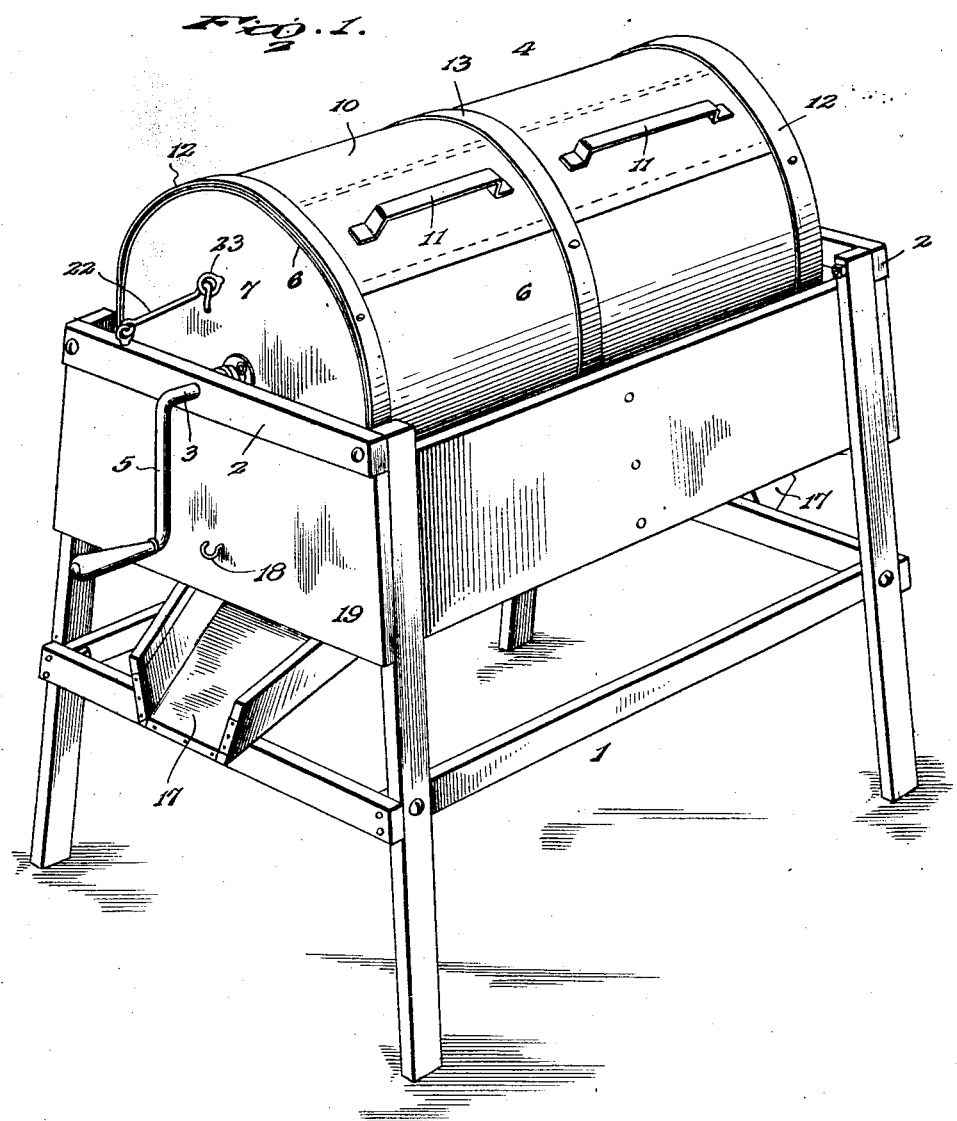

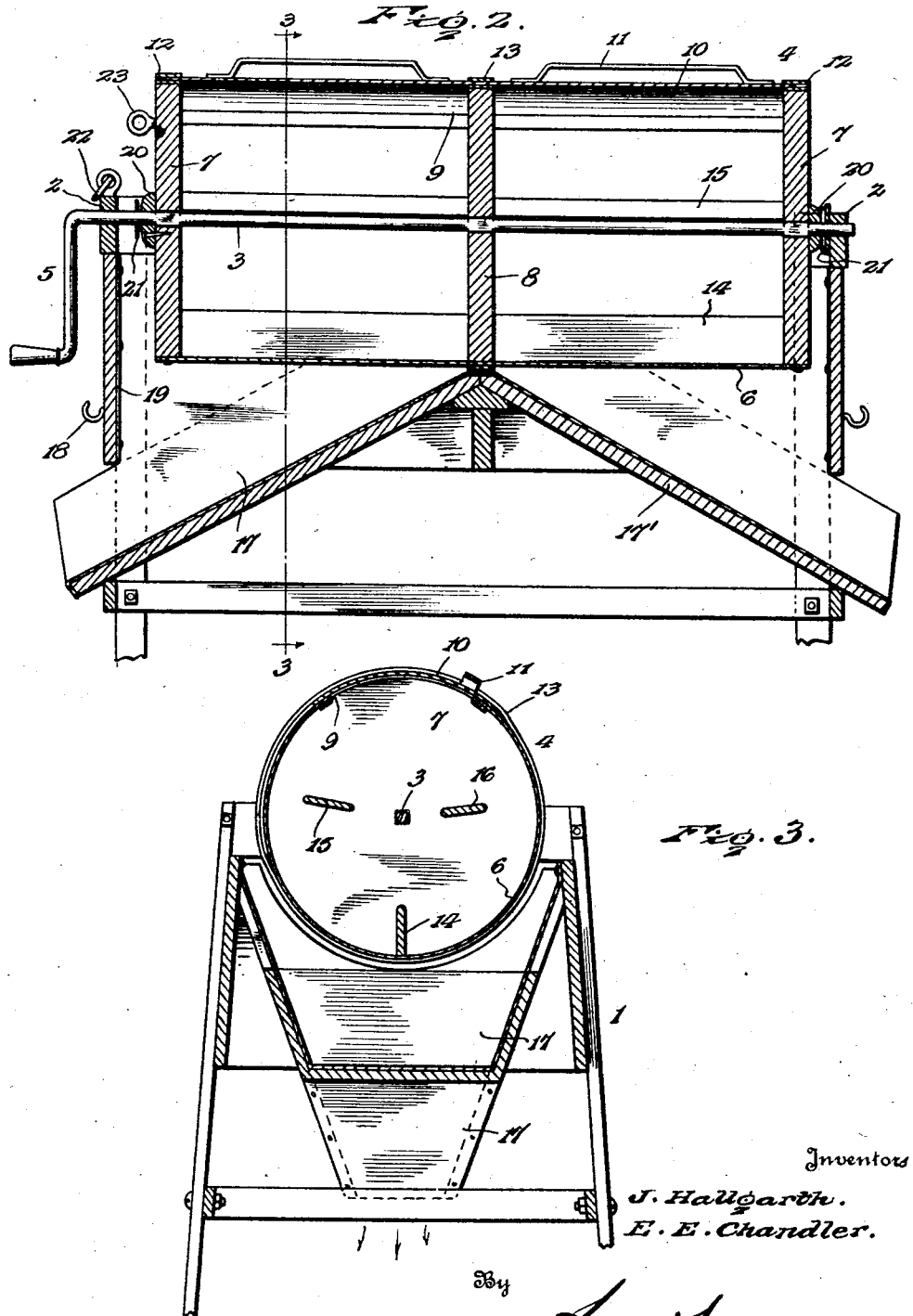

1,655,144

UNITED STATES PATENT OFFICE.

JOSEPH HALLGARTH AND EARL E. CHANDLER, OF ELGIN, OREGON.

GRAIN-TREATING MACHINE.

Application filed April 22, 1925. Serial No. 25,108.

This invention relates to means for treating grain seed to prevent smut, and has for its object the provision of a simple inexpensive apparatus by the use of which seed may be subjected to the action of a measured quantity of copper carbonate and the entire body of seed quickly treated. Another object of the invention is to provide an apparatus for the stated purpose which may be easily operated and which will prevent escape of dust or fumes so that the operator will be protected against contact with the poison. Other objects of the invention will appear incidentally in the course of the following description, and the invention resides in certain novel features which will be particularly pointed out in the appended claim.

In the accompanying drawings:

Figure 1 is a perspective view of an apparatus embodying our invention;

Fig. 2 is a central longitudinal section of the same, and

Fig. 3 is a transverse section on the line 3—3 of Fig. 2.

In carrying out the invention, we employ a supporting frame 1 which may be of any suitable construction which will possess the requisite strength and is preferably rectangular in form. In the end members 2 of the supporting frame, we journal a shaft 3 which carries a drum 4 between the end members and is equipped at one end with means whereby it may be rotated. In the drawings, we have illustrated a crank handle 5 for convenience, but it will be understood, of course, that the shaft may be equipped with a band pulley or a gear so that the apparatus may be operated by a suitable motor. The drum 4 is preferably a sheet metal cylindrical shell, as shown at 6, having heads 7 preferably of wood and also preferably provided at its center with a transverse partition 8 whereby the cylinder or drum is divided into two compartments, thereby permitting the treatment of two measured quantities of seed or two different kinds of seed simultaneously. The cylinder 6 is provided with a longitudinal opening, indicated at 9, to facilitate the placing of the seed and the powder within the compartments of the drum, and a cover 10 is slidably mounted upon the drum to extend over the opening when the device is in use. This cover is provided with handles 11 to facilitate its manipulation and has its ends fitted under keeper bands 12 secured peripherally upon the heads 7. It will be noted that the keeper bands or strips 12 are spaced from the surface of the drum or cylinder 6 through portions of their lengths so that the ends of the cover may fit slidably under the bands and be held to the drum by the same, and a similar keeper band 13 is secured centrally upon the drum over the partition 8 so that the cover will be held tightly to the drum when in its closed position and thereby prevent the escape of poisonous dust. Within the drum are provided a plurality of paddles or stirrer blades 14, 15 and 16 which extend longitudinally of the drum and, as shown clearly in Fig. 3, are spaced at unequal radial distances from the shaft 3 which extends through the drum and is engaged with the head 7 and the partition 8 so that, when the shaft is rotated, the drum will also rotate. The paddle or agitator blade 14 is located immediately adjacent the shell or cylinder 6, while the paddles 15 and 16 are located at points intermediately between the shaft and the shell of the drum so that, when the drum is rotated, the entire body of seed and powder will be acted upon by the paddles. It will also be noted upon reference to Fig. 3 that the paddle 14 is disposed diametrically opposite the opening 9 and the paddles 15 and 16 are so disposed that, when the drum is in such position that the opening is uppermost, as shown in Fig. 3, the paddles will be out of alinement with the opening and will offer no obstruction to the pouring of the seed and the powder thereinto, or the flow therefrom when discharging.

Secured in the main frame 1 below the drum and extending from the longitudinal center of the frame to and through the ends thereof are chutes 17 through which the treated seed may be discharged into receptacles placed below them or into bags or similar containers suspended on hooks 18 and having their mouths fitted around the ends of the chutes. The hooks 18 are secured in the end members of the supporting frame and the said end members 19 extend down to the upper edges of the side walls of the chutes so that loss of seed will be prevented and the entire body of the discharging seed will be directed into the receptacles. The drum or cylinder is supported out of contact with the end members of the supporting frame so that it may rotate freely, and endwise movement of the drum and the shaft may be prevented by any preferred means. We have illustrated stop collars 20 secured upon the ends of the drum and cotter pins 21 inserted through the shaft so as to bear against the stop collars. In order that the drum may be held against rotation while the seed is being poured thereinto, we provide a latch 22 in the form of a hook pivoted to one end member of the supporting frame and adapted to engage an eye 23 on the end of the drum, the eye being so located that, when it is engaged by the latch hook, the opening 9 will be at the top of the drum.

In use, a measured quantity of the seed to be treated and of the powder for the treatment are poured into the drum through the opening or openings 9 and the cover 10 moved to closed position. The latch 22 is then released and the drum rotated. The rotation of the drum will obviously cause commingling of the seed and the powder, and the several agitator blades will lift the seeds and the powder and then discharge the lifted portions so that the powder will work through the entire quantity of seed and will reach all the surfaces of all the seeds. The paddle 14 being located directly at the shell of the drum will prevent the seed accumulating at the bottom of the drum and clinging to the shell as the same rotates while the paddles 15 and 16 will work through the body of seed at different distances from the power shaft so that there will be no portion of the seed left at rest while the drum is rotating. When the rotation of the drum has been continued through such period of time as experience has demonstrated to be sufficient, the cover is moved to open position and the drum then given one-half a revolution to bring the openings 9 to the bottom of the drum over the discharge chutes, whereupon the treated seed will at once flow from the drum into and through the chutes and collect in the receptacles provided therefor, and in this connection it may be noted that the sides of the chutes are extended upwardly, as clearly shown in Fig. 2, to such an extent as will prevent the seed escaping from the drum over the sides of the chutes and being lost.

Our device is exceedingly simple in construction and is very efficient in use. The lid is held frictionally in place and fits to the drum so closely that it practically forms a leaf-proof joint therewith and the escape of poisonous dust is prevented. The escape of the dust has been a very serious objection to machines for this purpose heretofore employed inasmuch as this dust, if inhaled in any considerable quantity, is apt to seriously affect the health of the operator. The arrangement of the paddles or longitudinally extending agitator blades is important inasmuch as by the peculiar arrangement they prevent all stagnation of the seed within the drum and afford a very thorough commingling of the powder and the seed so that, when the rotation of the drum ceases, there will be left no untreated seed. While we have shown and described a drum having two compartments, it will be understood, of course, that the drum may be made in various sizes and in some of the smaller sizes will have only one compartment. Various other changes may be made in the minor details without departing from the spirit or scope of the invention as the same is defined in the following claim.

Having thus described the invention, we claim:

A machine for the purpose set forth comprising a supporting structure, a chute carried by said support and extending outwardly therefrom, a cylindrical drum of imperforate material throughout rotatably mounted in the supporting structure above the chute and provided with an opening in its circumference, a cover movable into and out of closing relation to the opening, said cover being arcuate in cross section whereby to complete the circumference of the drum when in closed position, agitators consisting of rigid blades disposed radially of the drum and secured to and extending between the ends of the drum for the full length thereof, one of said blades abutting the circular wall of the drum diametrically opposite the opening therein and projecting from the inner surface of the wall radially of the drum and the other blades being out of alinement with said opening and disposed intermediate the wall and axis of the drum at an unequal distance from the axis of the drum with their marginal portions moving in paths overlapping the path of travel of the marginal portions of companion blades.

In testimony whereof we affix our signatures.

JOE HALLGARTH. [L. S.]
EARL E. CHANDLER. [L. S.]